United States Patent
He et al.

(10) Patent No.: US 12,223,136 B2
(45) Date of Patent: *Feb. 11, 2025

(54) TOUCH SUBSTRATE AND DISPLAY DEVICE

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Fan He, Beijing (CN); Kemeng Tong, Beijing (CN); Cong Fan, Beijing (CN); Yu Wang, Beijing (CN); Hongwei Ma, Beijing (CN); Qian Ma, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/504,687

(22) Filed: Nov. 8, 2023

(65) Prior Publication Data

US 2024/0077972 A1    Mar. 7, 2024

Related U.S. Application Data

(63) Continuation of application No. 17/770,899, filed as application No. PCT/CN2021/084456 on Mar. 31, 2021, now Pat. No. 11,874,991.

(51) Int. Cl.
*G06F 3/041* (2006.01)
*G06F 3/044* (2006.01)
*G06F 3/045* (2006.01)

(52) U.S. Cl.
CPC ........ *G06F 3/04164* (2019.05); *G06F 3/0445* (2019.05); *G06F 3/045* (2013.01); *G06F 2203/04107* (2013.01)

(58) Field of Classification Search
None
See application file for complete search history.

(56) References Cited

U.S. PATENT DOCUMENTS

| | | | |
|---|---|---|---|
| 11,880,520 B2 * | 1/2024 | Kim | G06F 3/0412 |
| 2010/0271319 A1 | 10/2010 | Goo et al. | |

(Continued)

FOREIGN PATENT DOCUMENTS

| | | |
|---|---|---|
| CN | 104461135 A | 3/2015 |
| CN | 105739734 A | 7/2016 |

(Continued)

OTHER PUBLICATIONS

Extended European Search Report of EP Application No. 21933760 dated May 9, 2023, 11 pages.

(Continued)

*Primary Examiner* — Amare Mengistu
*Assistant Examiner* — Sarvesh J Nadkarni
(74) *Attorney, Agent, or Firm* — MUNCY, GEISSLER, OLDS & LOWE, P.C.

(57) ABSTRACT

This application provides a touch substrate and a display device. The touch substrate comprises a touch area and a peripheral area surrounding the touch area. The touch substrate further comprises: a touch electrode and a touch signal line that are coupled to each other. At least portion of the touch electrode is located in the touch area. At least portion of the touch signal line is located in the peripheral area, the touch signal line comprises at least one corner portion, the at least one corner portion comprises a first part, a second part and a third part that are connected end to end in (Continued)

sequence, an extension direction of the first part is the same as an extension direction of the third part, and an extension direction of the second part intersects with the extension direction of the first part.

20 Claims, 5 Drawing Sheets

(56) References Cited

U.S. PATENT DOCUMENTS

| | | | |
|---|---|---|---|
| 2016/0170537 A1 | 6/2016 | Chen et al. |
| 2016/0328035 A1 | 11/2016 | Zou |
| 2017/0156206 A1 | 6/2017 | Kogawa et al. |
| 2017/0185195 A1 | 6/2017 | Kim et al. |
| 2019/0074328 A1 | 3/2019 | Park |
| 2021/0173506 A1 | 6/2021 | Yoshida |
| 2021/0333942 A1 | 10/2021 | Zhang |

FOREIGN PATENT DOCUMENTS

| | | |
|---|---|---|
| CN | 106201106 A | 12/2016 |
| CN | 106371255 A | 2/2017 |
| CN | 109426395 A | 3/2019 |
| CN | 110854138 A | 2/2020 |
| CN | 110896089 A | 3/2020 |
| CN | 111373356 A | 7/2020 |
| CN | 112506373 A | 3/2021 |
| EP | 3623918 A1 | 3/2020 |

OTHER PUBLICATIONS

International Search Report and Written Opinion of PCT/CN2021/084456 and English translation, Jan. 6, 2022, 12 pages.
Office Action of U.S. Appl. No. 17/770,899 dated May 26, 2023, 14 pages.
Notice of Allowance of U.S. Appl. No. 17/770,899 dated Sep. 12, 2023, 14 pages.
Corrected Notice of Allowability of U.S. Appl. No. 17/770,899 dated Sep. 18, 2023, 3 pages.
An Office Action in corresponding CN Application No. 202211504641.1 mailed Sep. 27, 2024 is attached, 22 pages.

* cited by examiner

TOUCH SUBSTRATE AND DISPLAY DEVICE

CROSS-REFERENCE TO RELATED APPLICATIONS

The present is a continuation application of U.S. application Ser. No. 17/770,899, which is the U.S. national phase of PCT Application No. PCT/CN2021/084456 filed on Mar. 31, 2021, the disclosure of which is incorporated in its entirety by reference herein.

TECHNICAL FIELD

The present disclosure relates to the field of display technologies, and in particular to a touch substrate and a display device.

BACKGROUND

With the rapid development of Active-matrix organic light-emitting diode (AMOLED) display technology, AMOLED display products are widely applied in various fields for their advantages such as low power consumption, wide color gamut and large size. In addition, in order to better enhance the user experience of AMOLED display products, the AMOLED display products also integrate a touch structure, so that the display products have both display and touch functions.

SUMMARY

The present disclosure is to provide a touch substrate and a display device.

In order to achieve the above objective, the present disclosure provides the following technical solutions.

In a first aspect, the present disclosure provides a touch substrate, which includes a touch area and a peripheral area surrounding the touch area. The touch substrate further includes a touch electrode and a touch signal line that are coupled to each other; at least portion of the touch electrode is located in the touch area; at least portion of the touch signal line is located in the peripheral area, the touch signal line includes at least one corner portion, each of the at least one corner portion includes a first part, a second part and a third part that are connected end to end in sequence, an extension direction of the first part is the same as an extension direction of the third part, and an extension direction of the second part intersects with the extension direction of the first part. A width of the second part in a direction perpendicular to the extension direction of the second part is larger than a width of the first part in a direction perpendicular to the extension direction of the first part, and/or is larger than a width of the third part in a direction perpendicular to the extension direction of the third part.

Optionally, the touch substrate includes a plurality of touch signal lines, a plurality of corner portions included by the plurality of the touch signal lines are divided into at least one group of corner portions, a plurality of second parts included by each of the at least one group of corner portions are arranged at intervals along a first direction, and the first direction intersects with both the extension direction of the first part and the extension direction of the second part.

Optionally, in a same one group of corner portions, an angle a1 of the first direction and an extension direction of the first part meets a condition: $30° \leq a1 \leq 80°$.

Optionally, the extension direction of the second part is not perpendicular to the first direction, and an angle between the first part and the second part belonging to a same one of the touch signal lines and an angle between the third part and the second part are both obtuse angles.

Optionally, a minimum spacing between a plurality of second parts belonging to one group of corner portions is larger than a spacing between a plurality of first parts in the one group of corner portions, and/or is larger than a spacing between a plurality of third parts in the one group of corner portions.

Optionally, the first part and the third part do not overlap in the extension direction of the first part, and the first part and the third part do not overlap in the direction perpendicular to the extension direction of the first part.

Optionally, the third part is closer to the touch area than the first part.

Optionally, the width of the second part in the direction perpendicular to the extension direction of the second part is 1.5 to 4 times of the width of the first part in the direction perpendicular to the extension direction of the first part.

Optionally, the touch signal line includes a first conductive layer and a second conductive layer arranged in different layers; each of the first conductive layer and the second conductive layer includes the corner portion, and a second part of the first conductive layer is coupled to a second part of the second conductive layer.

Optionally, the touch substrate further includes a touch insulation layer arranged between the first conductive layer and the second conductive layer, the touch insulation layer includes a first via hole, an orthographic projection of the first via hole onto a base substrate of the touch substrate overlaps with an orthographic projection of the second part of the first conductive layer onto the base substrate, and overlaps with an orthographic projection of the second part of the second conductive layer onto the base substrate, and the second part in the first conductive layer is coupled to the second part in the second conductive layer through the first via hole.

Optionally, an orthographic projection of the first via hole onto the base substrate extends in a same direction as the second part.

Optionally, in the direction perpendicular to the extension direction of the second part, a width of the first via hole is 0.2 to 0.5 times of a width of the second part.

Optionally, the touch electrode includes a plurality of first touch electrodes and a plurality of second touch electrodes, the first touch electrode includes a plurality of first electrode patterns formed as an integral structure, the second touch electrode includes a plurality of second electrode patterns arranged in sequence, and adjacent two of the second electrode patterns are coupled through a connecting bridge; the first electrode patterns and the second electrode patterns are arranged in a same layer and made of a same material, and the second electrode patterns are arranged in a layer different from the connecting bridge; the first conductive layer is arranged in a same layer and made of a same material as the first electrode patterns; and the second conductive layer is arranged in a same layer and made of a same material as the connecting bridge.

Optionally, the plurality of second touch electrodes are arranged along a second direction; among at least some of touch signal lines electrically connected to the second touch electrodes, each touch signal line includes a first compensated line segment, and a plurality of first compensated line segments included by at least some of the touch signal lines are arranged along the second direction; and a first compensated line segment closest to the touch area among the first compensated line segments is coupled to a second touch electrode closest to the first compensated line segment among the second touch electrodes.

Optionally, at least part of the touch signal lines includes a first compensated line segment, the first compensated line segment includes at least two first corner portions, and each of the at least two first corner portions includes the first part, the second part and the third part; and at least two first corner portions belonging to a same one of the touch signal lines are located on a same side of the touch area, the at least two first corner portions are arranged substantially along the extension direction of the first part, and a minimum distance between each of the at least two first corner portions and the touch area is different from a minimum distance between any other of the at least two first corner portions and the touch area.

Optionally, at least part of the touch signal lines further include a first uncompensated line segment, the first uncompensated line segment and the first compensated line segment are located on different sides of the touch area, and the first uncompensated line segment is coupled to a first end of the first compensated line segment and the touch electrode; and the first uncompensated line segment includes at least one second corner portion, and each of the at least one second corner portion includes the first part, the second part and the third part.

Optionally, among the first corner portion included by the first compensated line segment, the third part is closer to the first uncompensated line segment than the first part.

Optionally, a minimum width of the first uncompensated line segment in a direction perpendicular to an extension direction of the first uncompensated line segment is larger than a width of the first part of the first compensated line segment in a direction perpendicular to the extension direction of the first compensated line segment.

Optionally, the touch substrate includes a touch chip, and the touch signal line further includes a second compensated line segment and a second uncompensated line segment; and at least portion of the second compensated line segment extends in a same direction as the first part, at least portion of the second compensated line segment is located on a side of the first compensated line segment facing away from the touch area, and the second compensated line segment is coupled to a second end of the first compensated line segment and a first end of the second uncompensated line segment; and a second end of the second uncompensated line segment is coupled to the touch chip.

Optionally, a width of the second compensated line segment in a direction perpendicular to an extension direction of the second compensated line segment is equal to the width of the first part in a direction perpendicular to the extension direction of the first part, and/or is equal to the width of the third part in the direction perpendicular to the extension direction of the third part.

Optionally, a width of the second uncompensated line segment in a direction perpendicular to an extension direction of the second uncompensated line segment is larger than the width of the second compensated line segment in the direction perpendicular to the extension direction of the second compensated line segment.

Optionally, each of the first conductive layer and the second conductive layer includes the first compensated line segment, the second compensated line segment, the first uncompensated line segment and the second uncompensated line segment; the first uncompensated line segment included by the first conductive layer is coupled to the first uncompensated line segment included by the second conductive layer; and the second uncompensated line segment included by the first conductive layer is coupled to the second uncompensated line segment included by the second conductive layer.

Based on the technical solution of the touch substrate, in a second aspect, the present disclosure provides a display device, including the above-mentioned touch substrate.

Optionally, the display device further includes a display panel, where the touch substrate and the display panel are stacked, and the touch substrate is located on a light-emitting side of the display panel.

BRIEF DESCRIPTION OF THE DRAWINGS

The accompanying drawings, which are included to provide a further understanding of the present disclosure, constitute a portion of this disclosure. Illustrative embodiments of the present disclosure and descriptions thereof serve to explain the present disclosure and do not constitute an undue limitation of the present disclosure. In the drawings.

DETAILED DESCRIPTION

In order to further explain the touch substrate and the display device provided by the embodiments of the present disclosure, the following detailed description will be made in detail with reference to the accompanying drawings.

In the related technologies, in the case where a touch structure is integrated in a display product, the touch structure generally includes a touch electrode and a touch signal line, and the touch signal line is used for transmitting a signal to the touch electrode or feeding back a signal sensed by the touch electrode. Due to the limited layout space and different layout modes of touch signal lines, the uniformity of signals transmitted by the touch signal lines is poor.

The present disclosure provides a touch substrate. A touch electrode and a touch signal line are arranged on the touch substrate. A resistance compensated design is adopted in the touch signal line, that is, the length of at least portion of the touch signal line is extended while the line width of the extended portion is reduced, so as to ensure the uniformity of resistances of various touch signal lines in the touch substrate and ensure the uniformity of transmission signals of various touch signal lines in the touch substrate.

Figure 3:
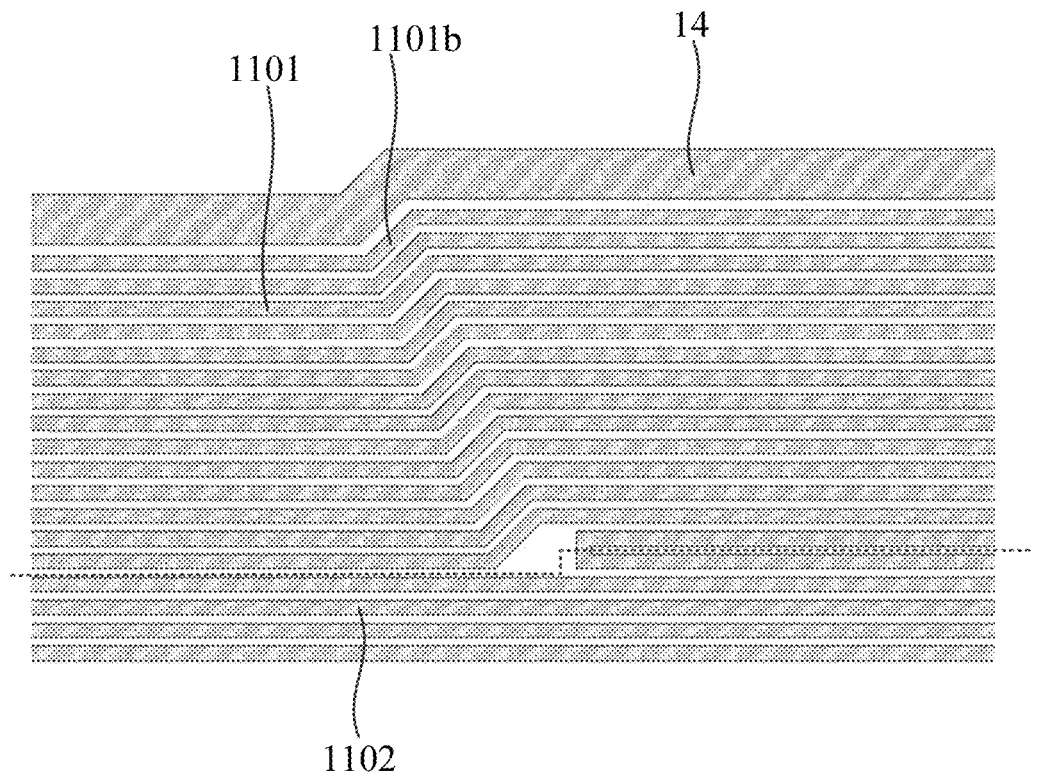
FIG. 3 is a first enlarged schematic diagram of portion A3 of FIG. 2.
Figure 5:
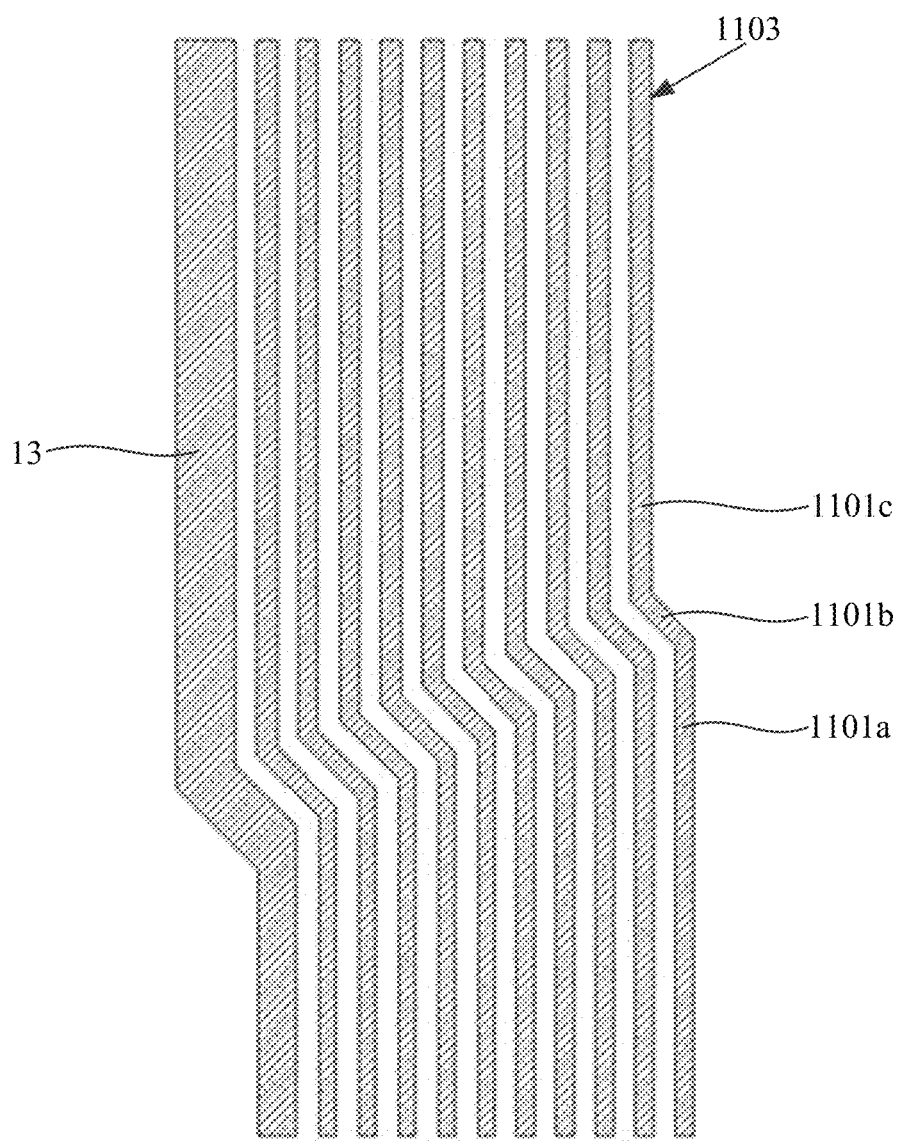
FIG. 5 is a first enlarged schematic diagram of portion A2 of FIG. 1.

As shown in FIG. 3 and FIG. 5, after the compensation design is performed in the above-mentioned touch substrate, a corner region (such as a position where 1101b is located) may appear on a touch signal line, and there is a risk that the touch signal line is broken in the corner region.

Figure 1:
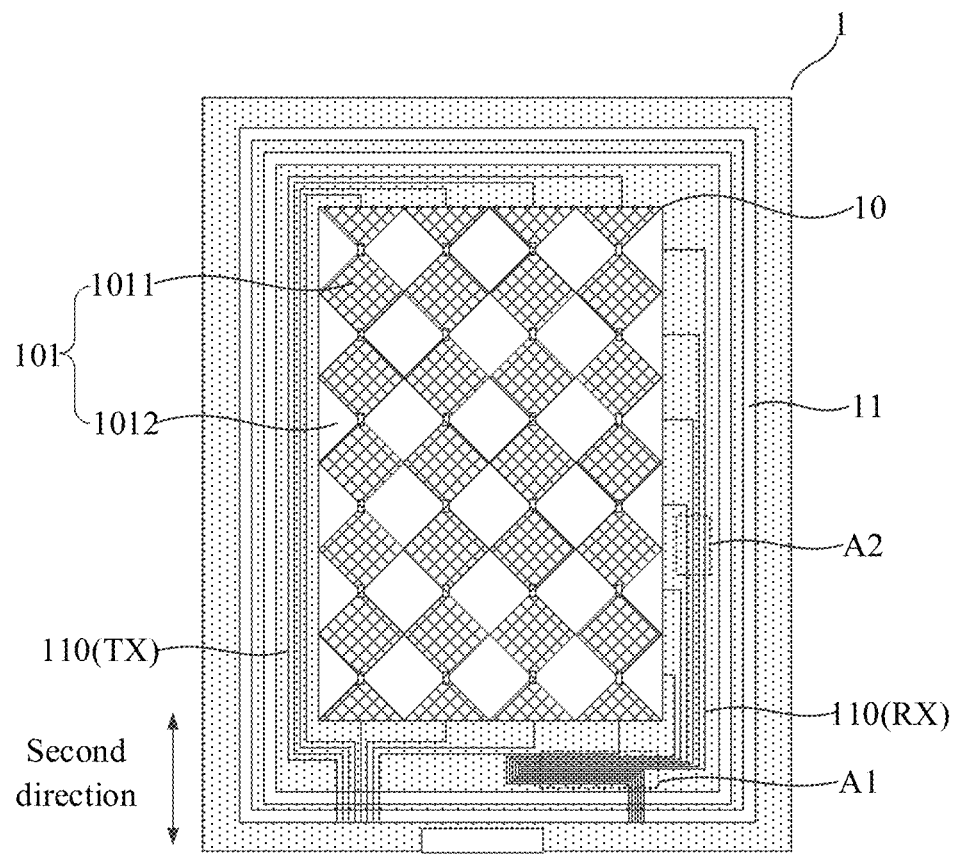
FIG. 1 is a schematic structural diagram of a touch substrate provided by an embodiment of the present disclosure.
Figure 2:
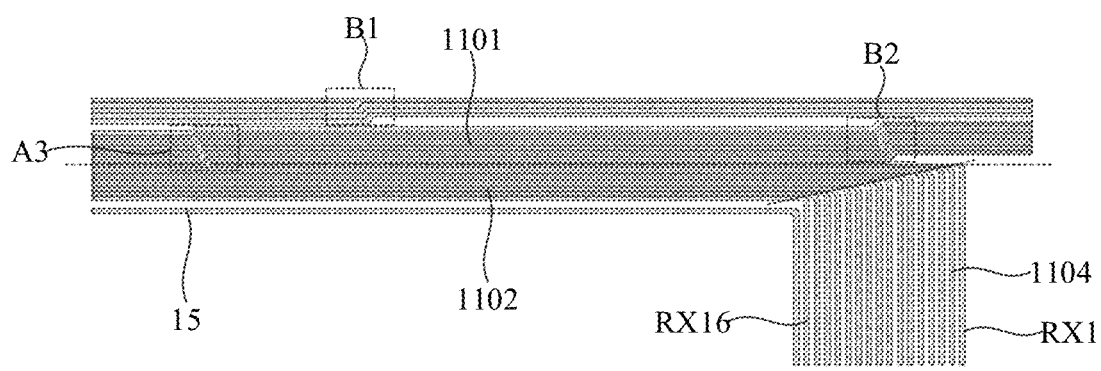
FIG. 2 is an enlarged schematic diagram of portion A1 of FIG. 1.
Figure 4:
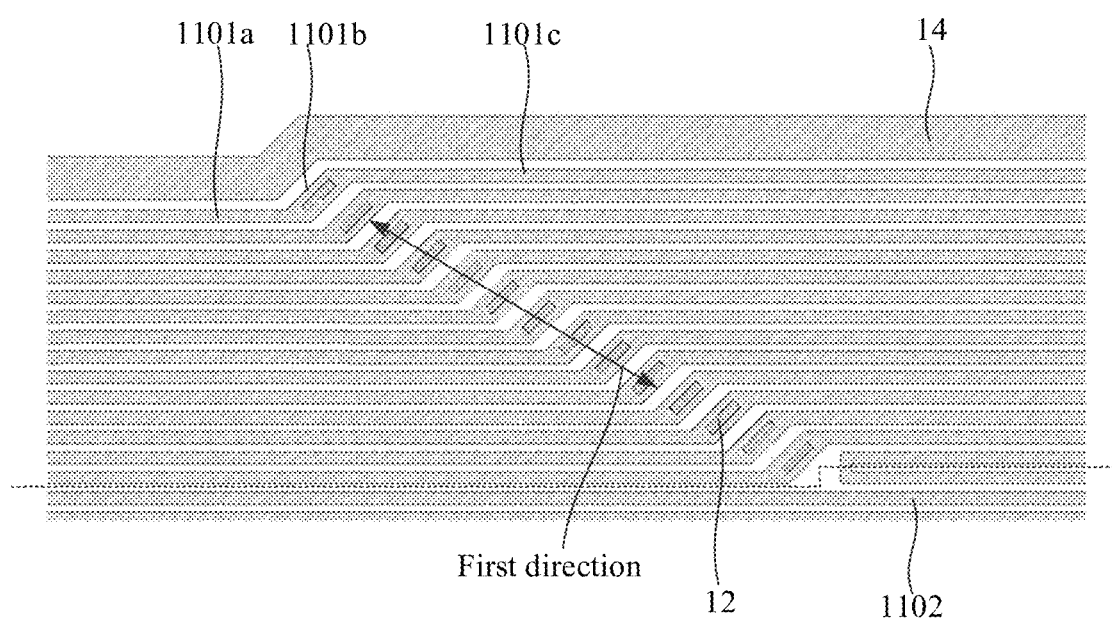
FIG. 4 is a second enlarged schematic diagram of portion A3 of FIG. 2.

With reference to FIGS. 1, 2 and 4, embodiments of the present disclosure provide a touch substrate 1, which includes: a touch area 10 and a peripheral area 11 surrounding the touch area 10. The touch substrate 1 also includes a touch electrode 101 and a touch signal line 110 which are coupled with each other. At least portion of the touch electrode 101 is located in the touch area 10. At least portion of the touch signal line 110 is located in the peripheral area 11, and the touch signal line 110 includes at least one corner portion. The corner portion includes a first part 1101a, a second part 1101b and a third part 1101c successively connected end to end, extension directions of the first part 1101a and the third part 1101c are the same, and an extension direction of the second part 1110b intersects with the extension direction of the first part 1101a.

A width of the second part 1101b in a direction perpendicular to its own extension direction is larger than a width of the first part 1101a in a direction perpendicular to its own extension direction, and/or larger than the width of the third part 1101c in a direction perpendicular to its own extension direction.

Illustratively, the touch substrate 1 includes the touch area 10 and the peripheral area 11, where the touch area 10 is provided with the touch electrode 101, and the peripheral area 11 is provided with the touch signal line 110 and a touch chip. The touch signal line 110 is connected between the corresponding touch electrode 101 and the touch chip, and is configured to transmit a signal provided by the touch chip to the corresponding touch electrode 101, and/or to transmit a signal on the corresponding touch electrode 101 to the touch chip.

Illustratively, the touch substrate 1 includes a touch substrate of a self-capacitance mode or a touch substrate of a mutual-capacitance mode.

Illustratively, when the touch substrate 1 is actually used, a user performs touch on a touch area 10, a touch electrode 101 of the touch area 10 feeds back a sensed signal to a touch chip, and the touch chip determines a touch position based on the received touch signal.

Illustratively, the touch substrate 1 includes a plurality of touch electrodes 101 and a plurality of touch signal lines 110, and at least portion of the touch electrodes 101 are connected to the touch signal lines 110 in a one-to-one correspondence.

Illustratively, the touch signal line 110 includes at least one corner portion, and the at least one corner portion includes the first part 1101a, the second part 1101b, and the third part 1101c. The second part 1101b is located between the first part 1101a and the third part 1101c, and the second part 1101b is coupled to the first part 1101a and the third part 1101c. Illustratively, a first compensated line segment 1101 forms a corner region at the second part 1101b.

Illustratively, the third part 1101c is closer to the touch area 10 than the first part 1101a.

Illustratively, the touch substrate 1 includes a rectangular touch substrate, the touch substrate 1 includes an upper frame and a lower frame arranged opposite to each other, and further includes a left frame and a right frame arranged opposite to each other, and a touch chip included by the touch substrate 1 is arranged at the lower frame. Illustratively, the first part 1101a and the third part 1101c extend in the same direction as the upper frame and the lower frame.

Illustratively, the first part 1101a and the third part 1101c extend in the same direction as the left frame and the right frame. Illustratively, an angle a2 between an extension direction of the second part 1101b and an extension direction of the first part 1101a is such that: $0°<a2\leq90°$.

According to the above-mentioned specific structure of the touch substrate 1, it can be seen that in the touch substrate 1 provided by the embodiments of the present disclosure, the width of the second part 1101b in the direction perpendicular to its own extension direction is larger than the width of the first part 1101a in the direction perpendicular to its own extension direction, and/or the width of the second part 1101b in the direction perpendicular to its own extension direction is larger than the width of the third part 1101c in the direction perpendicular to its own extension direction, which widens the width of the corner portion at the corner where the second part 1101b is located, thereby reducing the risk that the touch signal line 110 is broken at a corner.

As shown in FIGS. 2 and 4, in some embodiments, the touch substrate 1 includes a plurality of the touch signal lines 110, the plurality of the corner portions included by the plurality of the touch signal lines 110 are divided into at least one group of corner portions (such as a portion A3, a portion B1 and a portion B2 in FIG. 2). A plurality of second parts 1101b included by each group of corner portions are arranged at intervals along a first direction, and the first direction intersects both the extension direction of the first part 1101a and the extension direction of the second part 1101b.

Illustratively, the first direction is perpendicular to the extension direction of the second part 1101b.

Illustratively, an angle between the first direction and the extension direction of the first part 1101a is less than or equal to 45 degree.

In the touch substrate 1 provided in the above-mentioned embodiments, a plurality of the second parts 1101b included in each group of corner portions are arranged at intervals along a first direction, and the first direction intersects with both the extension direction of the first part 1101a and the extension direction of the second part 1101b. Thus, even if the width of the second part 1101b is widened, the overall width of the corner portions included in the touch signal lines 110 in the direction perpendicular to the extension direction of the first part 1101a can be ensured to remain unchanged. Therefore, the touch substrate 1 provided by the above-mentioned embodiments avoids increasing the frame width of the touch substrate 1 occupied by the whole corner portion while reducing the risk of broken of the touch signal line 110 at the corner, which is beneficial to narrow the frame of the touch substrate 1.

In some embodiments, in the same group of corner portions, the angle a1 between the first direction and the extension direction of the first part is arranged such that: $300°\leq a1\leq80°$.

The above-mentioned arrangement not only avoids increasing the frame width of the touch substrate 1 occupied by the whole corner portion, but also widens the width of the second part 1101b to the maximum extent, which better reduces the risk that the touch signal line 110 may be disconnected at the corner.

In some embodiments, the extension direction of the second part is arranged to be not perpendicular to the first direction, and the angle between the first part and the second part belonging to the same touch signal line and the angle between the third part and the second part are both obtuse angles.

In the same touch signal line, an included angle between the first part and the second part and an included angle between the third part and the second part are both obtuse angles.

The above-mentioned arrangement is more conducive to reduce the frame width of the touch substrate 1 occupied by the whole corner portion while reduce the risk of disconnection of the touch signal line 110 at the corner, which is beneficial to achieve a narrow frame of the touch substrate 1.

In some embodiments, a minimum spacing between a plurality of the second parts 1101b belonging to one group of corner portions is larger than a spacing between a plurality of first parts 1101a in the group of corner portions, and/or is larger than a spacing between a plurality of third parts 1101c in the group of corner portions.

The above-mentioned arrangement not only avoids increasing the frame width of the touch substrate 1 occupied by the whole corner portion, but also widens the width of the second part 1101b to the maximum extent, and better reduces the risk of disconnection of the touch signal line 110 at the corner. Moreover, the above arrangement also advantageously reduces the risk of short-circuiting between adjacent second parts 1101b.

In some embodiments, the first part and the third part are arranged not to overlap in the extension direction of the first part, and the first part and the third part are arranged not to overlap in a direction perpendicular to the extension direction of the first part.

In some embodiments, the third part is arranged closer to the touch area than the first part.

The above-mentioned arrangement is not only conducive to reduce the difficulty of layout of the touch signal lines and to ensure the connection performance between the touch signal lines and the touch electrodes, but also conducive to reduce the frame width of the touch substrate 1 occupied by the whole corner portions and beneficial to narrow of the frame of the touch substrate 1 while reduce the risk of disconnection of the touch signal line 110 at the corner.

In some embodiments, the width of the second part in a direction perpendicular to its own extension direction is 1.5 to 4 times of the width of the first part in a direction perpendicular to its own extension direction.

The above-mentioned arrangement is more conducive to reduce the frame width of the touch substrate 1 occupied by the whole corner portions while reduce the risk of disconnection of the touch signal line 110 at the corner, which is beneficial to narrow the frame of the touch substrate 1.

In some embodiments, the touch signal line 110 includes a first conductive layer and a second conductive layer which are arranged in different layers; and both the first conductive layer and the second conductive layer include the corner portion, and the second part 1101b in the first conductive layer is coupled to the second part 1101b in the second conductive layer.

Illustratively, an orthographic projection of the first conductive layer onto the base substrate of the touch substrate 1 at least partially overlaps an orthographic projection of the second conductive layer onto the base substrate. Illustratively, the first conductive layer is coupled to the second conductive layer at a location other than the second part 1101b.

Illustratively, an insulating layer is arranged between the first conductive layer and the second conductive layer, and the insulating layer is made of an inorganic material such as silicon nitride.

Illustratively, an orthographic projection of the corner portion onto the base substrate included by the first conductive layer overlaps with an orthographic projection onto the base substrate of the corner portion included by the second conductive layer.

Illustratively, the first conductive layer and the second conductive layer are made of a metallic material.

Since the second part 1101b has a wider width in the direction perpendicular to its own extension direction, arranging the second part 1101b in the first conductive layer coupled to the second part 1101b in the second conductive layer enables better connection between the first conductive layer and the second conductive line layer, which achieves the better touch signal uniformity of the touch signal line 110 and reliability of the signal line itself.

It needs to be explained that, in order to ensure the uniformity of signals transmitted by touch signal lines 110, loads of various touch signal lines 110 in the touch substrate 1 need to be uniform; therefore, in the process of designing the touch signal lines 110, a relevant resistance compensated unit may be designed so as to better achieve the effect of uniform resistances of multiple touch signal lines 110. However, due to the limited layout space and the effectiveness of compensation, the minimum line width that can be achieved in the process will be used for relevant compensated in the design of compensating the lines. In order to ensure the connectivity of signal channels, a design with double-layer metal lines in parallel is adopted to reduce the risk of disconnection of signal channel.

As shown in FIG. 4, in some embodiments, the touch substrate further includes a touch insulation layer arranged between the first conductive layer and the second conductive layer, and the touch insulation layer includes a first via hole 12. An orthographic projection of the first via hole 12 onto the base substrate of the touch substrate 1 overlaps with an orthographic projection of the second part 1101b in the first conductive layer onto the base substrate, and overlaps with an orthographic projection of the second part 1101b in the second conductive layer onto the base substrate, and the second part 1101b in the first conductive layer is coupled to the second part 1101b in the second conductive layer through the first via hole 12.

As shown in FIG. 4, in some embodiments, an orthographic projection of the first via hole 12 onto the base substrate extends in the same direction as the second part 1101b.

Illustratively, the orthographic projection of the second part 1101b in the first conductive layer onto the base substrate of the touch substrate 1 and the orthographic projection of the second part 1101b in the second conductive layer onto the base substrate have an overlap region, the second part 1101b in the first conductive layer and the second part 1101b in the second conductive layer are coupled by a first via hole 12, and the orthographic projection of the first via hole 12 onto the base substrate is located in the overlap region.

Illustratively, the orthographic projection of the first via hole 12 onto the base substrate is rectangular. Illustratively, the size of the via hole is 5 μm×5 μm.

Illustratively, the extension direction of the orthographic projection of the first via hole 12 onto the base substrate is the same as the extension direction of the second part 1101b, and the minimum width of the orthographic projection of the first via hole 12 onto the base substrate in the direction perpendicular to its own extension direction is between 3 μm and 6 μm, which may include endpoint values.

Illustratively, a width of the second part 1101b perpendicular to its own extension direction is between 8 μm and 11 μm, which may include endpoint values. Illustratively, a minimum distance between a boundary of the second part 1110b and a boundary of the first via hole 12 is larger than or equal to 2.5 μm.

In the touch substrate 1 provided in the above-mentioned embodiments, by arranging the extension direction of the orthographic projection of the first via hole 12 onto the base substrate to be the same as the extension direction of the second part 1101b, it enables that the first via hole 12 can achieve a larger size, thereby ensuring a better connection performance between the second part 1101b in the first conductive layer and the second part 1110b in the second conductive layer.

In some embodiments, in a direction perpendicular to the extension direction of the second part, a width of the first via hole is 0.2 to 0.5 times of a width of the second part.

The above arrangement enables a larger size of the first via hole 12, ensuring a better connection performance between the second part 1101b in the first conductive layer and the second part 1101b in the second conductive layer.

Figure 7:
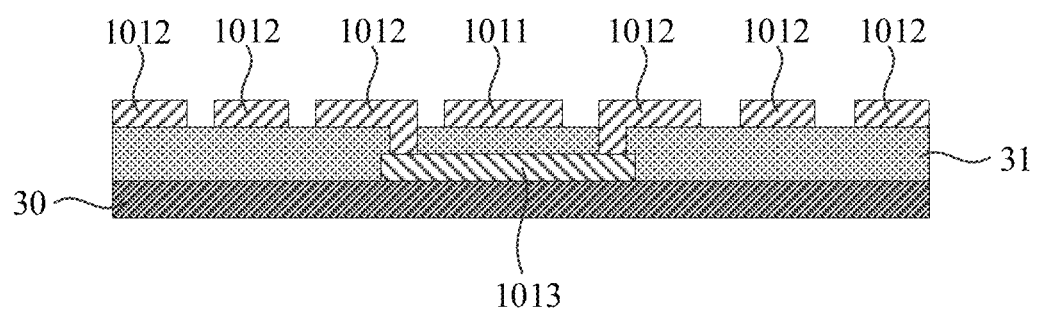
FIG. 7 is a schematic cross-sectional diagram of a touch electrode provided by an embodiment of the present disclosure.

As shown in FIGS. 1 and 7, in some embodiments, the touch electrode 101 includes a plurality of first touch electrodes 1011 and a plurality of second touch electrodes 1012. The first touch electrode 1011 includes a plurality of first electrode patterns formed as an integral structure, the second touch electrode 1012 includes a plurality of second electrode patterns arranged in sequence, and adjacent second electrode patterns are coupled through a connecting bridge 1013. The first electrode pattern and the second electrode pattern are arranged in a same layer and made of a same material, and the second electrode pattern and the connecting bridge 1013 are arranged in different layers; the first conductive layer and the first electrode pattern are arranged in a same layer and made of a same material; the second conductive layer and the connecting bridge 1013 are arranged in a same layer and made of a same material.

Illustratively, the first touch electrode 1011 includes a plurality of first electrode patterns, and the plurality of first electrode patterns are coupled in sequence to form an integral structure; the second touch electrode 1012 includes a plurality of second electrode patterns coupled in sequence, and an arrangement direction of the plurality of second electrode patterns intersects with an arrangement direction of the plurality of first electrode patterns.

Illustratively, the first electrode pattern and the second electrode pattern are arranged in a same layer and made of a same material, and can be formed in a same patterning process. There is gap between a first electrode pattern and a second electrode pattern that are adjacent, and the adjacent first electrode pattern and second electrode pattern are insulated from each other, and between which a capacitor structure can be formed.

Illustratively, an orthographic projection of the second electrode pattern onto the base substrate and an orthographic projection of the connecting bridge 1013 onto the base substrate have an overlap region, the second electrode pattern and the connecting bridge 1013 are connected through a via hole, and the orthographic projection of the via hole onto the base substrate is located at the overlap region.

Illustratively, the first touch electrode 1011 includes one of a driving electrode and a sensing electrode, and the second touch electrode 1012 includes the other one of the driving electrode and the sensing electrode.

The above-mentioned arrangement that the first conductive layer and the first electrode pattern are formed in the same layer and made of the same material enables the first conductive layer and the first electrode pattern to be formed simultaneously in the same patterning process, thus greatly simplifying a manufacturing process of the touch substrate 1 and reducing the manufacturing cost of the touch substrate 1.

The above-mentioned arrangement that the second conductive layer and the connecting bridge 1013 are formed in the same layer and made of the same material enables the second conductive layer and the connecting bridge 1013 can be formed simultaneously in the same patterning process, thus greatly simplifying a manufacturing process of the touch substrate 1 and reducing the manufacturing cost of the touch substrate 1.

As shown in FIGS. 1 and 2, in some embodiments, the plurality of second touch electrodes 1012 are arranged in a second direction. Among at least some of the touch signal lines electrically connected to the second touch electrodes, each touch signal line includes a first compensated line segment 1101, and a plurality of first compensated line segments 1101 included in at least some of the touch signal lines are arranged along the second direction. A first compensated line segment 1101 closer to the touch area than any other first compensated line segments is coupled to a second touch electrode 1012 closer to the first compensated line segment 1101 than any other second touch electrodes.

Illustratively, at least portion of the touch signal lines includes a sensing signal line.

Illustratively, a first compensated line segment 1101 closest to the touch area among the first compensated line segments 1101 is coupled to a second touch electrode 1012 closest to the first compensated line segment 1101 among the second touch electrodes 1012; a first compensated line segment 1101 secondly closest to the touch area among the first compensated line segments 1101 is coupled to a second touch electrode 1012 secondly closest to the first compensated line segment 1101 among the second touch electrodes 1012; and so on, until a first compensated line segment 1101 furthest from the touch area among the first compensated line segments 1101 is coupled to a second touch electrode 1012 furthest from the first compensated line segment 1101 among the second touch electrodes 1012.

The above-mentioned arrangement effectively reduces the difficulty of layout of the touch signal lines while ensuring that the touch signal lines are coupled to the touch electrodes.

As shown in FIG. 2, in some embodiments, at least some of the touch signal lines includes a first compensated line segment 1101, and the first compensated line segment 1101 includes at least two first corner portions. The first corner portion includes a first part 1101a, a second part 1101b and a third part 1101c. The at least two first corner portions belonging to the same touch signal line are located on a same side of the touch area 10, the at least two first corner portions are arranged substantially along the extension direction of the first part 1101a, and minimum distances between the at least two first corner portions and the touch area are different from each other.

Illustratively, one of the at least two first corner portions (for example, B2) is closer to the touch area 10 than any other of the first corner portions (for example, A3).

Illustratively, the two first corner portions are located at a lower frame of the touch substrate 1. Illustratively, one of the two first corner portions is located at a position near the middle of the lower frame, and another of the two first corner portions is located at a position near the corner of the touch substrate 1.

Illustratively, the touch signal line 110 further includes an incoming line portion coupled to the touch chip (e.g., a second uncompensated line segment 1104 mentioned subsequently), another of the two first corner portions is located between the touch area 10 and the incoming line portion.

Figure 6:
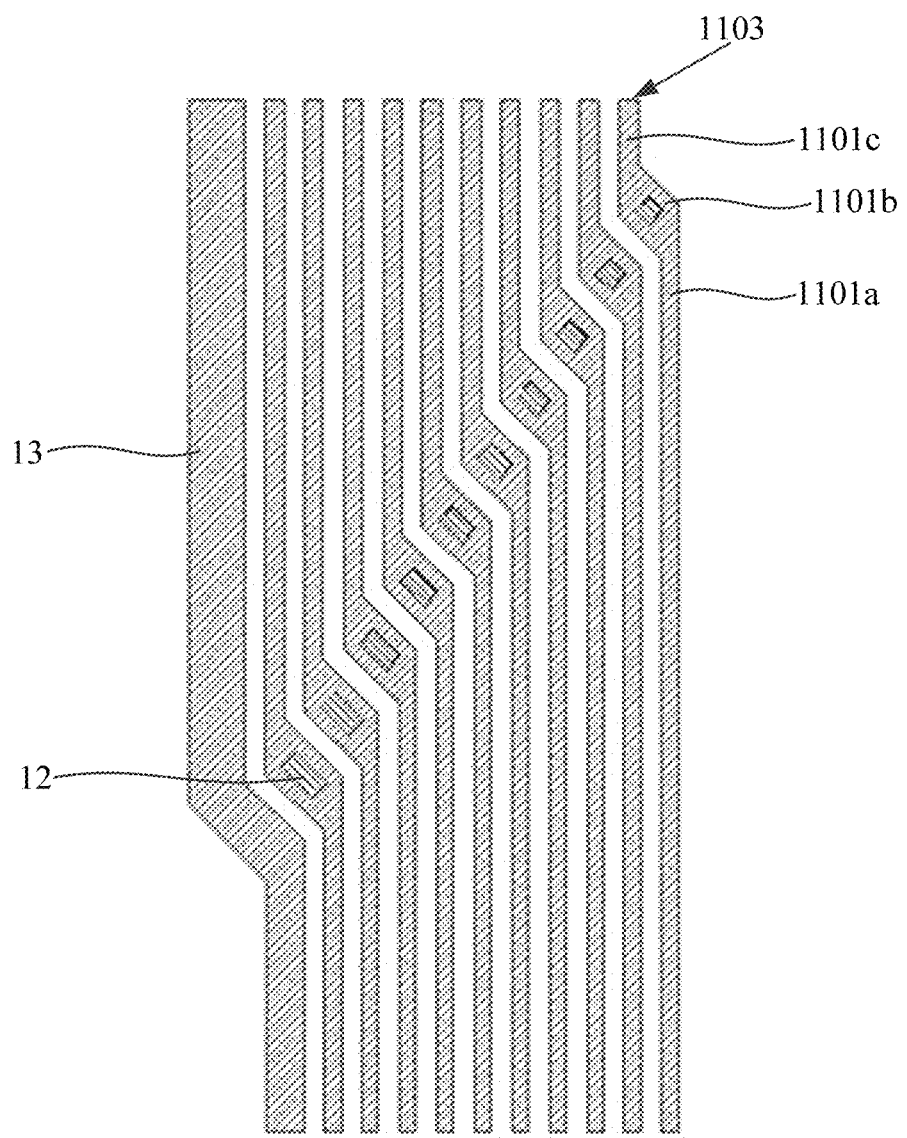
FIG. 6 is a second enlarged schematic diagram of portion A2 of FIG. 1.

To explain, referring to FIG. 1, FIG. 2 and FIG. 6, FIG. 2 shows that second uncompensated line segments 1104 included by touch signal lines RX1 to RX16 are arranged in sequence from right to left. In each RX line, the second uncompensated line segment 1104 extends in a direction from the touch chip to the touch area until being coupled to a second compensated line segment 1102; the second compensated line segment 1102 continues to extend to the left from a position coupled to the second uncompensated line segment 1104 until being coupled to one end of a first compensated line segment 1101; and the first compensated line segment 1101 continues to extend to the right from a position coupled to the second compensated line segment 1102 until being coupled to a first uncompensated line segment 1103.

At the lower frame of the touch substrate, all the touch signal lines RX1 to RX16 adopt a layout manner of turning to the left first and then turning to the right, and a first compensated line segment 1101 and a second compensated line segment 1102 of each RX line are both located at a peripheral area of the first compensated line segment 1101 and the second compensated line segment 1102 of a RX line that is adjacent and previous to the each RX line.

In order to better achieve the layout of the first compensated line segment 1101 and the coupling between the first compensated line segment and the corresponding first uncompensated line segment 1103, the first compensated line segment 1101 is designed to include two first corner portions.

In the touch substrate 1 provided in the above-mentioned embodiments, by arranging the first compensated line segment 1101 to include two first corner portions, it is not only conducive to reduce the difficulty of layout of the touch signal lines 110, but also conducive to narrow a frame of the touch substrate 1.

As shown in FIG. 1 and FIG. 6, in some embodiments, at least portion of the touch signal lines 110 further includes a first uncompensated line segment 1103, the first uncompensated line segment 1103 and the first compensated line segment 1101 are located on different sides of the touch area 10, and the first uncompensated line segment 1103 is coupled to a first end of the first compensated line segment 1101 and the touch electrode 101. The first uncompensated line segment 1103 includes at least one second corner portion, and the second corner portion includes a first part 1101a, a second part 1110b, and a third part 1101c.

Illustratively, the first compensated line segment 1101 is located at a lower frame of the touch substrate 1, namely, located at the lower side of the touch area 10; the first uncompensated line segment 1103 is located at a left frame or a right frame of the touch substrate 1, namely, located at the left side or the right side of the touch area 10.

Illustratively, at least portion of the first uncompensated line segment 1103 extends along the left frame or the right frame.

Illustratively, one end of the first uncompensated line segment 1103 is coupled to a first end of the first compensated line segment 1101, and the other end of the first uncompensated line segment 1103 is coupled to the touch electrode 101.

Illustratively, the first uncompensated line segment 1103 includes at least one second corner portion, and the second corner portion includes a first part 1101a, a second part 1101b and a third part 1101c that are connected end to end in sequence. An extension direction of the first part 1101a is the same as an extension direction of the third part 1101c, and the extension direction of the second part 1101b intersects with the extension direction of the first part 1101a. A width of the second part 1110b in a direction perpendicular to its own extension direction is larger than a width of the first part 1101a in a direction perpendicular to its own extension direction, and/or is larger than a width of the third part 1101c in a direction perpendicular to its own extension direction.

In the touch substrate 1 provided in the above-mentioned embodiments, by arranging that the first uncompensated line segment 1103 includes at least one second corner portion, the width of the first uncompensated line segment 1103 at the corner where the second part 1101b is located is widened, which reduces a risk of disconnection of the first uncompensated line segment 1103 at the corner.

In some embodiments, in the first corner portions included by the first compensated line segment 1101, the third part 1101c is closer to the first uncompensated line segment 1103 than the first part 1101a.

The above-mentioned arrangement is not only conducive to reduce the difficulty of layout of the touch signal lines and ensure the performance of connections between the touch signal lines and the touch electrodes, but also conducive to reduce a frame width of the touch substrate 1 occupied by the whole corner portions and beneficial to narrow a frame of the touch substrate 1 while reduce a risk that the touch signal line 110 may be broken at the corner.

In some embodiments, a minimum width of the first uncompensated line segment 1103 in a direction perpendicular to its own extension direction is arranged to be larger than the width of the first part 1101a of the first compensated line segment 1101 in a direction perpendicular to its own extension direction.

Illustratively, the minimum width of the first uncompensated line segment 1103 in a direction perpendicular to its own extension direction includes a minimum of the following three widths: a minimum width of a first part 1101a included by a corner portion in the first uncompensated line segment 1103 in a direction perpendicular to its own extension direction, a minimum width of a second part 1101b included by the corner portion in the first uncompensated line segment 1103 in a direction perpendicular to its own extension direction, and a minimum width of a third part 1101c included by the corner portion in the first uncompensated line segment 1103 in a direction perpendicular to its own extension direction.

The above-mentioned arrangement enables the first uncompensated line segment 1103 to have a wider line width, so that when the first uncompensated line segment 1101 is coupled to the touch electrode 101 through the first uncompensated line segment 1103, the performance of a connection between the first uncompensated line segment 1101 and the touch electrode 101 can be ensured.

In some embodiments, the touch substrate 1 includes a touch chip, and the touch signal line 110 further includes a second compensated line segment 1102 and a second uncompensated line segment 1104. At least portion of the second compensated line segment 1102 extends in the same direction as the first part 1101a, and at least portion of the second compensated line segment 1102 is located at a side of the first compensated line segment 1101 facing away from the touch area 10. The second compensated line segment 1102 is coupled to a second end of the first compensated line segment 1101 and a first end of the second uncompensated line segment 1104; and a second end of the second uncompensated line segment 1104 is coupled to the touch chip.

Illustratively, the touch signal line 110 further includes a second compensated line segment 1102, and at least portion of the second compensated line segment 1102 extends towards a lower frame of the touch substrate 1. At least portion of the first compensated line segment 1101 is located between the second compensated line segment 1102 and the touch area 10.

Illustratively, a first end of the second compensated line segment 1102 is coupled to a first end of the second uncompensated line segment 1104, and a second end of the second compensated line segment 1102 is coupled to a second end of the first compensated line segment 1101.

Illustratively, the touch signal line 110 further includes a second uncompensated line segment 1104, and a second end of the second uncompensated line segment 1104 is coupled to a corresponding pin in the touch chip. Illustratively, an extension direction of the second uncompensated line segment 1104 intersects the extension direction of the first part 1101a of the first compensated line segment 1101. Illustratively, the extension direction of the second uncompensated line segment 1104 is perpendicular to the extension direction of the first part 1101a of the first compensated line segment 1101.

In the touch substrate 1 provided in the above-mentioned embodiment, by arranging that the touch signal line 110 further includes the second compensated line segment 1102 and the second uncompensated line segment 1104, the uniformity of the touch signal lines 110 is compensated in the lower frame, and it also ensures a good connection performance between the touch signal line 110 and the touch chip.

In some embodiments, a width of the second compensated line segment 1102 in a direction perpendicular to its own extension direction is arranged equal to the width of the first part 1101a in a direction perpendicular to its own extension, and/or equal to the width of the third part 1101c in a direction perpendicular to its own extension direction.

Illustratively, a width of the second compensated line segment 1102 in a direction perpendicular to its own extension direction is equal to the width of the first part 1101a in the first compensated line in the direction perpendicular to its own extension direction, and/or, is equal to the width of the third part 1101c in the first compensated line in the direction perpendicular to its own extension direction.

Since the width of the first part 1101a in the first compensated line in the direction perpendicular to its own extension direction is relatively small, the above-mentioned arrangement enables the second compensated line segment 1102 to have a relatively small width, so that the uniformity compensation of the touch signal lines 110 can be realized, and at the same time, the touch signal lines 110 can be prevented from occupying an excessively wide frame width, which is beneficial to the development of a narrow frame of the touch substrate 1.

In some embodiments, the width of the second uncompensated line segment 1104 in the direction perpendicular to its own extension direction is arranged to be larger than the width of the second compensated line segment 1102 in the direction perpendicular to its own extension direction.

The above-mentioned arrangement ensures the reliability of the second uncompensated line segments 1104, and ensures the performance of connections between the first compensated line segments 1101 and the touch chip.

In some embodiments, each of the first conductive layer and the second conductive layer includes the first compensated line segment, the second compensated line segment 1102, the first uncompensated line segment 1103, and the second uncompensated line segment 1104. A first uncompensated line segment 1103 included by the first conductive layer is coupled to a first uncompensated line segment 1103 included by the second conductive layer. A second uncompensated line segment 1104 included by the first conductive layer is coupled to a second uncompensated line segment 1104 included by the second conductive layer.

Illustratively, the first compensated line segment 1101, the second compensated line segment 1102, the first uncompensated line segment 1103, and the second uncompensated line segment 1104 included by the first conductive layer are formed as an integral structure. Illustratively, the first compensated line segment 1101, the second compensated line segment 1102, the first uncompensated line segment 1103, and the second uncompensated line segment 1104 included by the second conductive layer are formed as an integral structure.

Illustratively, an orthographic projection of a first uncompensated line segment 1103 included by the first conductive layer onto the base substrate and an orthographic projection of a first uncompensated line segment 1103 included by the second conductive layer onto the base substrate have an overlap region, the first uncompensated line segment 1103 included by the first conductive layer and the first uncompensated line segment 1103 included by the second conductive layer are coupled through a via hole, and an orthographic projection of the via hole onto the base substrate is located in the overlap region.

Illustratively, the first uncompensated line segment 1103 included by the first conductive layer is close to an end of the touch electrode 101, and is coupled to one end of the first uncompensated line segment 1103 included by the second conductive layer close to the touch electrode 101.

Illustratively, an overlap region exists between an orthographic projection of a second uncompensated line segment 1104 included by the first conductive layer onto the base substrate and an orthographic projection of the second uncompensated line segment 1104 included by the second conductive layer onto the base substrate; the second uncompensated line segment 1104 included by the first conductive layer is coupled to the second uncompensated line segment 1104 included by the second conductive layer through a via hole, and an orthographic projection of the via hole onto the base substrate is located in the overlap region.

Illustratively, the second uncompensated line segment 1104 included by the first conductive layer is close to one end of the touch chip, and is coupled to one end of the second uncompensated line segment 1104 included by the second conductive layer close to the touch chip.

In the touch substrate 1 provided in the above-mentioned embodiments, both the first conductive layer and the second conductive layer include the first compensated line segment 1101, the second compensated line segment 1102, the first uncompensated line segment 1103 and the second uncompensated line segment 1104, and the first conductive layer and the second conductive layer are coupled at the first uncompensated line segment 1103 and the second uncompensated line segment 1104, which not only better ensure the reliability and connection performance of the touch signal lines 110, but is also beneficial to the uniformity adjustment of the touch signal line 110.

In some embodiments, an orthographic projection of the first conductive layer onto the base substrate of the touch substrate 1 is arranged to overlap with an orthographic projection of the second conductive layer onto the base substrate.

The above-mentioned arrangement can minimize a layout space occupied by the touch signal lines 110, which is beneficial to the development of a narrow frame of the touch substrate 1.

As shown in FIG. 1 and FIG. 6, in some embodiments, the touch substrate 1 further includes a first shielded line 13, at least portion of the first shielded line 13 is located between the touch area 10 and the touch signal line 110.

Illustratively, the first shielded line 13 has a stable potential. Illustratively, the first shielded line 13 is loaded with a GND signal.

In the above-mentioned arrangement, the touch substrate 1 further includes the first shielded line 13, so that the first shielded line 13 well shields an interference between the touch signal line 110 and the touch electrode, so as to well ensure the stability of the touch signal transmitted by the touch signal line 110.

As shown in FIG. 1, in some embodiments, the touch signal line 110 includes a driving signal line TX and/or a sensing signal line RX.

Illustratively, the touch electrode 101 includes a plurality of first touch electrodes 1011 and a plurality of second touch electrodes 1012, where the first touch electrodes 1011 include a plurality of first electrode patterns formed in an integral structure, the second touch electrodes 1012 include a plurality of second electrode patterns arranged in sequence, and any adjacent two of the second electrode patterns are coupled through a connecting bridge 1013.

Illustratively, the first touch electrode 1011 includes a driving electrode, and the second touch electrode 1012 includes a sensing electrode.

Illustratively, a sensing signal line is coupled to a corresponding second touch electrode 1012, and a driving signal line is coupled to a corresponding first touch electrode 1011.

Illustratively, each first touch electrode 1011 corresponds to two driving signal lines, where one driving signal line is coupled to a first end of the corresponding first touch electrode 1011 and the touch chip, and the other driving signal line is coupled to a second end of the corresponding first touch electrode 1011 and the touch chip.

Illustratively, as shown in FIG. 2, a corner portion B1 included by the driving signal line TX is illustrated.

As shown in FIG. 1, FIG. 2, and FIG. 4, in some embodiments, at least a portion of the driving signal line TX is located between the sensing signal line RX and the touch area 10; the touch substrate 1 further includes a second shielded line 14, and at least a portion of the second shielded line 14 is located between the driving signal line and the sensing signal line.

Illustratively, the second shielded line 14 has a stable potential. Illustratively, the second shielded line 14 is loaded with a GND signal.

The above-mentioned arrangement provides that the touch substrate 1 further includes the second shielded line 14, and at least a portion of the second shielded line 14 is located between the driving signal line and the sensing signal line, so that the second shielded line 14 can well shield the interference between the driving signal line and the sensing signal line, thereby well ensuring the stability of signals transmitted by the driving signal line and the sensing signal line.

As shown in FIG. 2, in some embodiments, the touch substrate 1 further includes a third shielded line 15, where the third shielded line 15 is located at a side of the touch signal line away from the touch area, and at least portion of the third shielded line 15 extends along a boundary of the touch substrate 1 and can shield the interference onto the touch signal lines from the outside.

Embodiments of the present disclosure also provide a display device, including the touch substrate 1 provided in the above embodiments.

In the touch substrate 1 provided by the above-mentioned embodiments, the width of the second part 1110$b$ in the direction perpendicular to its own extension direction is arranged to be larger than the width of the first part 1101$a$ in the direction perpendicular to its own extension direction, and/or the width of the second part 1101$b$ in the direction perpendicular to its own extension direction is larger than the width of the third part 1101$c$ in the direction perpendicular to its own extension direction, the width of the corner portion at the corner where the second part 1101$b$ is located is widened, thereby reducing a risk of disconnection of the touch signal line 110 at the corner.

The display device including the touch substrate 1 provided by the embodiments of the present disclosure also has the above-mentioned advantageous effects, which will not be repeated herein.

It should be noted that the display device may be any product or component with a display touch function such as television, monitor, digital photo frame, mobile phone and tablet computer.

Figure 8:
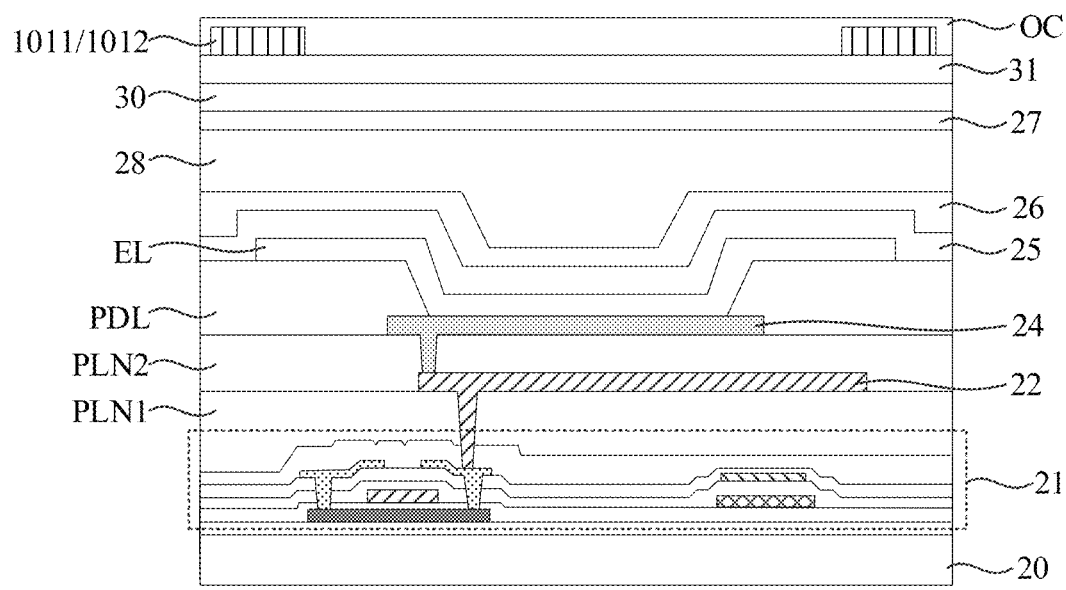
FIG. 8 is a first schematic cross-sectional diagram of a display device provided by an embodiment of the present disclosure.
Figure 9:
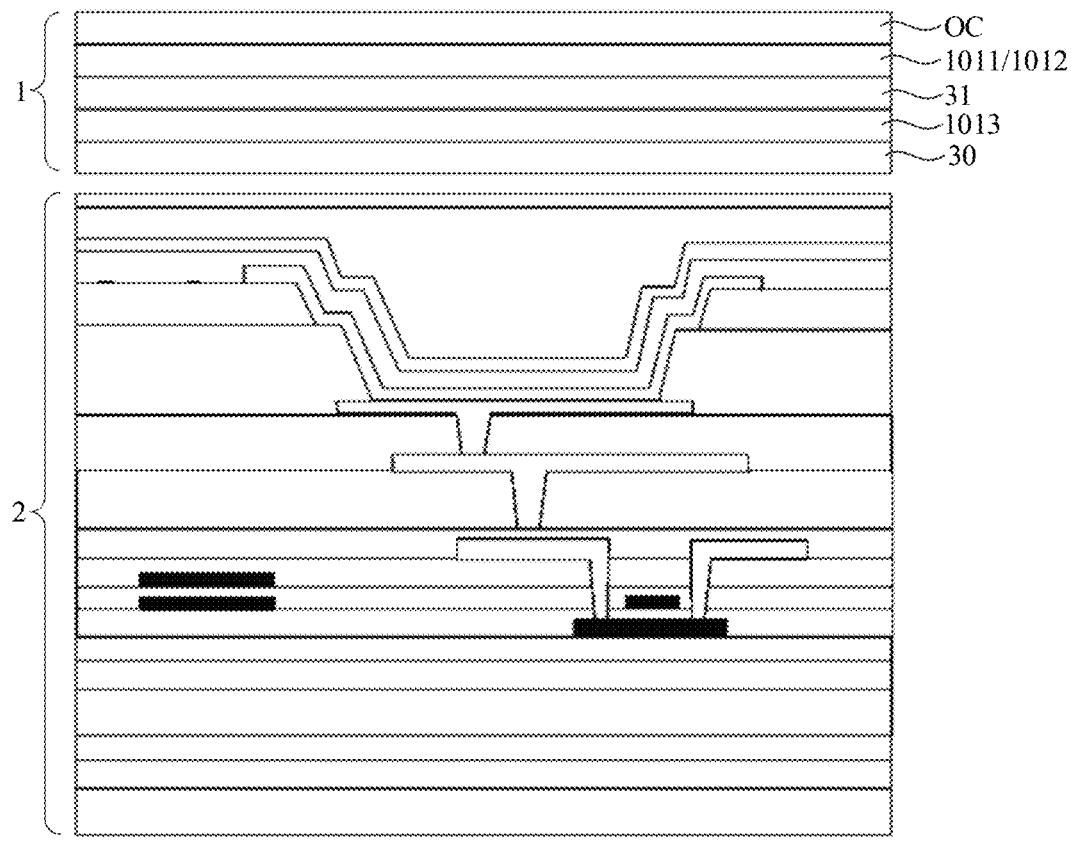
FIG. 9 is a second schematic cross-sectional diagram of a display device provided by an embodiment of the present disclosure.

As shown in FIGS. 8 and 9, in some embodiments, the display device further includes a display panel 2, and the touch substrate 1 is arranged stacked with the display panel 2, and the touch substrate 1 is located at a light-emitting side of the display panel 2.

Illustratively, the display panel 2 includes an AMOLED display panel 2. Illustratively, the display panel 2 includes a liquid crystal display panel 2.

Illustratively, the touch substrate 1 is arranged on a side of an encapsulation layer of the display panel 2 facing away from a base substrate of the display panel. Illustratively, the whole display panel 2 is reused as a base substrate of the touch substrate 1.

Illustratively, the display device includes a touch display product with a full screen.

Illustratively, an orthographic projection of the touch electrode 101 in the touch substrate 1 onto the base substrate 20 of the display panel 2 at least partially overlaps with an orthographic projection of a pixel defining layer in the display panel 2 onto the base substrate.

A Flexible Multi-Layer On Cell touch structure (abbreviated as FMLOC) is used in the display device in above-mentioned embodiments.

It should be noted that as shown in FIGS. 8 and 9, the display panel 2 includes a base substrate 20, a driving layer 21, a first planarization layer PLN1, a connection portion 22, a second planarization layer PLN2, an anode layer 24, a pixel defining layer PDL, a light-emitting layer EL, a cathode layer 25, a first inorganic encapsulation layer 26, a second inorganic encapsulation layer 27, and an organic encapsulation layer 28. The touch substrate 1 includes an inorganic insulating layer 30 (namely, a buffer layer), a touch insulation layer 31, a first touch electrode 1011, a second touch electrode 1012, a connecting bridge 1013 and a planarization layer OC.

In some embodiments, the display device further includes a display panel 2, and the touch substrate 1 is integrated in the display panel 2.

Illustratively, the base substrate 20 of the display panel 2 is reused as a base substrate of the touch substrate 1, and both the touch electrode 101 and the touch signal line 110 included by the touch substrate 1 are integrated in the display panel 2.

Embodiments of the present disclosure also provides a method for manufacturing a touch substrate, for manufacturing the touch substrate 1 provided in the above-mentioned embodiments. The touch substrate 1 includes a touch area 10 and a peripheral area 11 surrounding the touch area 10. The manufacturing method includes:

manufacturing a touch electrode 101, where at least portion of the touch electrode 101 is located in the touch area 10; and manufacturing a touch signal line 110, where the touch signal line 110 is coupled to the touch electrode 101, at least portion of the touch signal line 110 is located in the peripheral area 11; the touch signal line 110 includes a first compensated line segment 1101, the first compensated line segment 1101 includes at least one corner portion, and the corner portion includes a first part 1101a, a second part 1101b and a third part 1101c which are connected end to end in sequence; extension directions of the first part 1101a and the third part 1101c are the same, and an extension direction of the second part 1110b intersects with the extension direction of the first part 1101a; and a width of the second part 1101b in a direction perpendicular to its own extension direction is larger than a width of the first part 1101a in a direction perpendicular to its own extension direction, and/or larger than the width of the third part 1101c in a direction perpendicular to its own extension direction.

Illustratively, the touch substrate 1 includes the touch area 10 and the peripheral area 11, where the touch area 10 is provided with the touch electrode 101, and the peripheral area 11 is provided with the touch signal line 110 and a touch chip. The touch signal line 110 is connected between the corresponding touch electrode 101 and the touch chip, and is configured to transmit a signal provided by the touch chip to the corresponding touch electrode 101, and/or to transmit a signal on the corresponding touch electrode 101 to the touch chip.

Illustratively, the touch substrate 1 includes a touch substrate of a self-capacitance mode or a touch substrate of a mutual-capacitance mode.

Illustratively, when the touch substrate 1 is actually used, a user performs touch on a touch area 10, a touch electrode 101 of the touch area 10 feeds back a sensed signal to a touch chip, and the touch chip determines a touch position based on the received touch signal.

Illustratively, the touch substrate 1 includes a plurality of touch electrodes 101 and a plurality of touch signal lines 110, and at least portion of the touch electrodes 101 are connected to the touch signal lines 110 in a one-to-one correspondence.

Illustratively, the touch signal line 110 includes a first compensated line segment 1101, which includes at least one corner portion. The at least one corner portion includes the first part 1101a, the second part 1101b, and the third part 1101c. The second part 1101b is located between the first part 1101a and the third part 1101c, and the second part 1101b is coupled to the first part 1101a and the third part 1101c. Illustratively, the first compensated line segment 1101 forms a corner region at the second part 1101b.

Illustratively, the third part 1101c is closer to the touch area 10 than the first part 1101a.

Illustratively, the touch substrate 1 includes a rectangular touch substrate, the touch substrate 1 includes an upper frame and a lower frame arranged opposite to each other, and further includes a left frame and a right frame arranged opposite to each other, and a touch chip included by the touch substrate 1 is arranged at the lower frame. Illustratively, the first part 1101a and the third part 1101c extend in the same direction as the upper frame and the lower frame. Illustratively, the first part 1101a and the third part 1101c extend in the same direction as the left frame and the right frame. Illustratively, an angle a between an extension direction of the second part 1101b and an extension direction of the first part 1101a is such that: $0°<a≤90°$.

In the touch substrate 1 manufactured by the manufacturing method provided by the embodiments of the present disclosure, the width of the second part 1101b in the direction perpendicular to its own extension direction is larger than the width of the first part 1101a in the direction perpendicular to its own extension direction, and/or the width of the second part 1101b in the direction perpendicular to its own extension direction is larger than the width of the third part 1101c in the direction perpendicular to its own extension direction, which widens the width of the corner portion at the corner where the second part 1101b is located, thereby reducing the risk that the touch signal line 110 may be broken at the corner.

It should be noted that the various embodiments described herein are described in a progressive manner with reference to the same or similar portions throughout various embodiments, with each embodiment focusing on differences from the other embodiments. In particular, the method embodiments are described more simply because they are substantially similar to the product embodiments, with reference to the description of the product embodiments.

Unless defined otherwise, technical or scientific terms used in this disclosure shall have the ordinary meaning as understood by one of ordinary skill in the art to which this disclosure belongs. Such terms as "first", "second" and the like in this disclosure does not denote any order, quantity, or importance, but rather is used to distinguish one element from another. Such terms as "include" or "comprise" and the like means that the presence of an element or item preceding the word covers the presence of the element or item listed after the word and equivalents thereof, but does not exclude other elements or items. Such terms as "connected", "coupled", or "interconnected" and the like are not limited to physical or mechanical connections, but may include electrical connections, whether direct or indirect. Such terms as "upper", "lower", "left", "right" and the like are used only to indicate relative positional relationships that may change accordingly when the absolute position of the object being described changes.

It may be appreciated that when an element such as a layer, film, region or substrate is referred to as being "on" or "under" another element, it can be "directly on" or "directly under" the other element, or intervening elements may be present.

In the description of the above embodiments, particular features, structures, materials, or characteristics may be combined in any suitable manner in any one or more embodiments or examples.

The above embodiments are only specific implementation of the present disclosure, and the protection scope of the present disclosure is not limited thereto. Any person skilled in the art can easily think of changes or substitutions within the technical scope disclosed by the present disclosure, which shall fall within the protection scope of the present disclosure. Therefore, the protection scope of the present disclosure should be based on the protection scope of the appended claims.

What is claimed is:

1. A touch substrate, comprising a touch area and a peripheral area surrounding the touch area, wherein the touch substrate further comprises a touch electrode and a touch signal line that are coupled to each other;
   at least portion of the touch electrode is located in the touch area;
   at least portion of the touch signal line is located in the peripheral area, the touch signal line comprises a first part, a second part and a third part that are connected end to end in sequence, an extension direction of the first part is the same as an extension direction of the third part, and an extension direction of at least one side of the second part intersects with the extension direction of the first part; and
   a width of the second part in a direction perpendicular to the extension direction of the at least one side of the second part is larger than a width of the first part in a direction perpendicular to the extension direction of the first part, and is larger than a width of the third part in a direction perpendicular to the extension direction of the third part,
   wherein the touch signal line comprises a first conductive layer and a second conductive layer arranged in different layers; the second part is arranged on each of the first conductive layer and the second conductive layer, and the second part arranged on the first conductive layer is coupled to the second part arranged on the second conductive layer.

2. The touch substrate according to claim 1, wherein the touch substrate comprises a plurality of touch signal lines, each of the plurality of the touch signal lines includes the first part, the second part and the third part, a plurality of second parts of the plurality of the touch signal lines are arranged at intervals along a first direction, and the first direction intersects with both the extension direction of the first part and the extension direction of the at least one side of the second part.

3. The touch substrate according to claim 2, wherein an angle a1 of the first direction and an extension direction of the first part meets a condition that a1 is less than and equal to 80 degree.

4. The touch substrate according to claim 2, wherein the at least one side of the second part includes a first subside and a second subside that are opposite to each other, and an angle between the first part and the first subside or the second subside of the second part belonging to a same one of the touch signal lines and an angle between the third part and the first subside or the second subside of the second part are both obtuse angles.

5. The touch substrate according to claim 2, wherein a minimum spacing between adjacent two second parts is larger than a spacing between adjacent two first parts, and is larger than a spacing between adjacent two third parts.

6. The touch substrate according to claim 1, wherein the first part and the third part do not overlap in the extension direction of the first part, and the first part and the third part do not overlap in the direction perpendicular to the extension direction of the first part.

7. The touch substrate according to claim 1, wherein the third part is closer to the touch area than the first part.

8. The touch substrate according to claim 1, wherein the width of the second part in the direction perpendicular to the extension direction of the at least one side of the second part is 1.5 to 4 times of the width of the first part in the direction perpendicular to the extension direction of the first part.

9. The touch substrate according to claim 1, wherein the touch substrate further comprises a touch insulation layer arranged between the first conductive layer and the second conductive layer, the touch insulation layer comprises a first via hole, an orthographic projection of the first via hole onto a base substrate of the touch substrate overlaps with an orthographic projection of the second part of the first conductive layer onto the base substrate, and overlaps with an orthographic projection of the second part of the second conductive layer onto the base substrate, and the second part in the first conductive layer is coupled to the second part in the second conductive layer through the first via hole.

10. The touch substrate according to claim 9, wherein an extension direction of an orthographic projection of the first via hole onto the base substrate is the same as the extension direction of the at least one side of the second part.

11. The touch substrate according to claim 9, wherein in the direction perpendicular to the extension direction of the at least one side of the second part, a width of the first via hole is 0.2 to 0.5 times of a width of the second part.

12. The touch substrate according to claim 1, wherein the touch electrode comprises a plurality of first touch electrodes and a plurality of second touch electrodes, the first touch electrode comprises a plurality of first electrode patterns formed as an integral structure, the second touch electrode comprises a plurality of second electrode patterns arranged in sequence, and adjacent two of the second electrode patterns are coupled through a connecting bridge;
   the first electrode patterns and the second electrode patterns are arranged in a same layer and made of a same material, and the second electrode patterns are arranged in a layer different from the connecting bridge;
   the first conductive layer is arranged in a same layer and made of a same material as the first electrode patterns; and
   the second conductive layer is arranged in a same layer and made of a same material as the connecting bridge.

13. A touch substrate, comprising a touch area and a peripheral area surrounding the touch area, wherein the touch substrate further comprises a touch electrode and a touch signal line that are coupled to each other;
   at least portion of the touch electrode is located in the touch area;
   at least portion of the touch signal line is located in the peripheral area, the touch signal line comprises a first part, a second part and a third part that are connected end to end in sequence, each of the first part and the third part includes a first edge and a third edge, the second part includes a second edge, two ends of the second edge are connected to the first edge and the third edge respectively, an extension of the second edge intersects an extension direction of the first edge or an extension direction of the third edge,
   wherein the touch signal line comprises a first conductive layer and a second conductive layer arranged in different layers and a touch insulation layer arranged between the first conductive layer and the second conductive layer, each of the first conductive layer and the second conductive layer includes the second part, the touch insulation layer comprises a first via hole, the second part in the first conductive layer is coupled to the second part in the second conductive layer through the first via hole, an orthographic projection of the first via hole onto a base substrate of the touch substrate overlaps with an orthographic projection of the second part onto the base substrate.

14. The touch substrate according to claim 13, wherein a width of the second part in a direction perpendicular to the extension direction of the second edge is larger than a width of the first part in a direction perpendicular to the extension direction of the first edge, and is larger than a width of the third part in a direction perpendicular to the extension direction of the third edge.

15. The touch substrate according to claim 13, wherein an extension direction of an orthographic projection of the first via hole onto the base substrate is the same as the extension direction of the at least one edge of the second part.

16. The touch substrate according to claim 13, wherein the touch electrode comprises a plurality of first touch electrodes and a plurality of second touch electrodes, the first touch electrode comprises a plurality of first electrode patterns formed as an integral structure, the second touch electrode comprises a plurality of second electrode patterns arranged in sequence, and adjacent two of the second electrode patterns are coupled through a connecting bridge;

the first electrode patterns and the second electrode patterns are arranged in a same layer and made of a same material, and the second electrode patterns are arranged in a layer different from the connecting bridge;

the first conductive layer is arranged in a same layer and made of a same material as the first electrode patterns; and the second conductive layer is arranged in a same layer and made of a same material as the connecting bridge.

17. The touch substrate according to claim 13, wherein the touch substrate comprises a plurality of touch signal lines, each of the plurality of the touch signal lines includes a first part, a second part and a third part, a plurality of second parts of the plurality of the touch signal lines are arranged at intervals along the first direction, and the first direction intersects with each of the extension direction of the first edge of the first part, the extension direction of the second edge of the second part and the extension direction of the third edge of the third part.

18. The touch substrate according to claim 17, wherein a plurality of first via holes corresponding to the plurality of second parts are arranged at interval along the first direction.

19. A display device comprising the display substrate according to claim 13.

20. The display device according to claim 19, further comprising a display panel, the touch substrate and the display panel are stacked, the touch substrate is arranged at a light exiting side of the display panel.

* * * * *